United States Patent Office 3,177,255
Patented Apr. 6, 1965

3,177,255
PHENYLPROPYLAMINE DERIVATIVES
Gustav Ehrhart, Bad Soden, Taunus, Ernst Lindner, Frankfurt am Main, and Heinrich Ott, Eppstein, Taunus, Germany, assignors to Farbwerke Hoechst Aktiengesellschaft vormals Meister Lucius & Brüning, Frankfurt am Main, Germany, a corporation of Germany
No Drawing. Filed Jan. 3, 1962, Ser. No. 164,152
Claims priority, application Germany, Jan. 7, 1961, F 32,912
4 Claims. (Cl. 260—570.5)

The present invention relates to phenylpropylamine derivatives of the formula

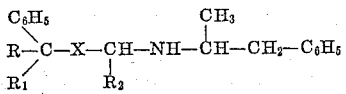

wherein R represent an alkyl group of low molecular weight or a phenyl radical, $R_1$ represent an alkyl group of low molecular weight, $R_2$ represents a hydrogen atom or the methyl group and X stands for the groups

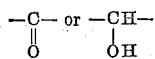

and their acid addition salts, which compounds are valuable medicaments showing, in particular, a very favorable action on cardiac and blood vascular circulation, as well as pharmaceutical compositions containing the compounds of the above-mentioned formula as active ingredients.

The present invention likewise relates to a process of preparing compounds of the above-mentioned formula by synthesizing them in a manner known for analogous compounds, preferably by reacting compounds of the formula

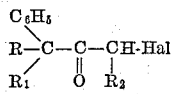

in which R, $R_1$ and $R_2$ have the meanings given above and Hal stands for a halogen atom, preferably a chlorine or bromine atom, with 1-phenyl-2-amino-propane and, if desired, reducing the compounds obtained.

The halogen ketones used as starting substances can be obtained, for instance, by bromination or chlorination of the corresponding ketones which, on their part, are prepared, for example, by reacting dialkyl-benzyl-cyanide or alkyl-diphenyl-acetonitrile with alkyl-magnesium-halides. For example, there are mentioned the following halogen ketones:

1-bromo-3,3-diphenyl-butanone-(2),
1-bromo-3,3-diphenyl-pentanone-(2),
1-bromo-3,3-diphenyl-hexanone-(2),
1-bromo-3,3-diphenyl-heptanone-(2),
1-bromo-3,3-diphenyl-4-methyl-pentanone-(2),
1-bromo-3-phenyl-3-ethyl-pentanone-(2),
1-bromo-3-phenyl-3-methyl-pentanone-(2),
1-bromo-3-phenyl-3-ethyl-hexanone-(2), as well as the corresponding 1-chloro-derivatives or likewise the 1-iodo-derivatives.

The reaction is suitably carried out in the presence of a solvent and of an agent binding hydrogen halide. As solvents may be used, for example, lower aliphatic alcohols such as methanol, ethanol, propanol, isopropanol, glycols such as diethylene-glycol, aromatic hydrocarbons such as benzene or toluene as well as other inert organic solvents. In order to bind the hydrogen halide set free in the course of the reaction it is of advantage to add in bimolecular excess the 1-phenyl-2-amino-propane used as reactant; other basic agents, for instance, alkali metal carbonates and alkaline earth metal carbonates, alkali metal hydroxides and alkaline earth metal hydroxides as well as organic bases, such as tertiary trialkylamine, pyridine or quinoline may likewise be used. If desired, the organic bases may simultaneously be used as solvents. In general, the reaction proceeds at room temperature and is completed suitably at an elevated temperature (up to the boiling point of the solvent). The further treatment is effected in the usual manner by eliminating—if desired upon removal of the solvent—the corresponding hydrogen halide salt by precipitation with ether or shaking out with water. The basic reaction products remaining behind are distilled or directly converted into their corresponding salts by addition of acids.

The amino ketones obtained may be converted in the usual manner by reduction of the keto group into amino alcohols. The reduction may be carried out, for instance, catalytically. As catalysts, there may be used, for instance, platinum as well as Raney nickel catalysts. As solvents for the catalytic hydro-generation there may be taken into consideration alcohols miscible with water, or water. The reduction may likewise be carried out by means of sodium boron hydride or with nascent hydrogen, for example, with aluminum amalgam and alcohol, sodium amalgam or lithium-aluminum hydride.

The products obtained according to the process of the invention as basic compounds may be converted into the corresponding salts by means of inorganic acids. As inorganic acids may be mentioned: Hydrohalic acids such as hydrochloric acid and hydrobromic acid, as well as sulfuric acid, phosphoric acid and amidosulfonic acid.

As organic acids may be mentioned, for example, formic acid, acetic acid, propionic acid, lactic acid, glycolic acid, gluconic acid, maleic acid, succinic acid, tartaric acid, benzoic acid, salicylic acid, citric acid, aceturic acid, hydroxy-ethanesulfonic acid and ethylene-diamino-tetracetic acid.

The new products obtained according to the process of the present invention are valuable medicaments showing an extraordinary favorable action on cardiac and blood vascular circulation. For example, one single injection of 10γ of the 1-[1'-phenyl-propyl-(2')]-amino-3,3-diphenyl-pentanone-(2) applied in the test on the isolated heart of the guinea pig according to the method of Langendorff provokes a strong dilation of the coronary vessels corresponding to an increase of the coronary perfusion by 36% referred to the initial position. The 1-[1'-phenyl-propyl-(2')]-amino-3,3-diphenyl-pentanol-(2) when applied in equal dose, likewise causes a strong dilatation of the coronary vessels.

On comparison with the known 1-phenyl-2-[1',1'-diphenyl-propyl-(3')]-amino-propane the new products of the invention exhibit the advantage of still being better tolerated while showing nearly the same activity. For example, the minimum lethal dose of the new compound 1-[1'-phenyl-propyl-(2')]-amino-3,3-diphenyl-pentanone-(2) when tested in mice amounts to 50 milligrams/kilogram and is thus much more reduced than the corresponding value of the known product 1-phenyl-2-[1',1'-diphenyl-propyl-(3')]-amino-propane whose minimum lethal dose in mice amounts to 15 milligrams/kilogram.

The products may be used as such or in the form of the corresponding salts, if desired in admixture with pharmaceutically usual carrier substances, parenterally or orally. If orally administered, they are used in the form of tablets or dragées into which the products of the invention may be incorporated together with the usual carrier substances such as lactose, starch, tragacanth, and magnesium stearate.

The following examples serve to illustrate the invention but they are not intended to limit it thereto:

EXAMPLE 1

*1-[1'-phenyl-propyl-(2')]-amino-3,3-diphenyl-pentanone-(2)*

To 11.9 grams of 3,3-diphenyl-pentanone-(2), dissolved in 50 cc. of methylene chloride, there are added dropwise 2.5 milliliters of bromine. After terminated bromination the methylene chloride solution is washed several times with water, then dried with sodium sulfate and freed from the solvent by distillation. There are obtained 16 grams of oily 1-bromo-3,3-diphenyl-pentanone-(2) which, as crude product, are subjected to a further treatment. 16 grams of 1-bromo-3,3-diphenyl-pentanone-(2) are dissolved in 50 milliliters of ethanol and combined with 15 grams of 1-phenyl-2-amino-propane. The mixture is allowed to stand over night. It is then heated for 15 minutes on the steam bath and the ethanol is distilled off under reduced pressure. The remaining oily residue is dissolved in ether. The ether solution is washed with water and shaken with 2 N-hydrochloric acid. Thereby, three layers are formed, the middle one of which consists of 1-[1'-phenyl-propyl-(2')]-amino - 3,3 - diphenyl-pentanone-(2)-hydrochloride which is a first oily. After prolonged standing the hydrochloride crystallizes; it is recrystallized from ethanol with addition of ether. The melting point is to 176–177° C.

EXAMPLE 2

*1-[1'-phenyl-propyl-(2')]-amino-3-phenyl-3-ethyl-pentanone-(2)*

According to the method described in Example 1 there are obtained from 13.8 grams of 1-bromo-3-phenyl-3-ethyl-pentanone-(2) (obtained by bromination of 3-phenyl-3-ethyl-pentanone-(2) and 15 grams of 1-phenyl-2-amino-propane) 16 grams of 1-[1'-phenyl-propyl-(2')]-amino-3-phenyl-3-ethyl-pentanone - (2) - hydrochloride having a melting point of 163–164° C.

EXAMPLE 3

*1-[1'-phenyl-propyl-(2')]-amino-3,3-diphenyl-pentanol-(2)*

3.71 grams of 1-[1'-phenyl-propyl-(2')]-amino-3,3-diphenyl-pentanone-(2) obtained according to the method described in Example 1 are dissolved in 15 milliliters of methanol and 0.3 gram of sodium boron hydride is portionwise added. After standing of the mixture for 15 minutes the methanol is distilled off and the solid residue is shaken with dilute sodium hydroxide solution and ether. After separation of the layers and drying of the ether, the ether solution is rendered acidic to Congo paper by means of alcoholic hydrochloric acid. There are obtained 3.7 grams of 1-[1'-phenyl-propyl-(2')]-amino - 3,3 - diphenyl-pentanol-(2)-hydrochloride of a melting point of 195–196° C. (from ethanol).

We claim:

1. The compounds of the group consisting of (1) phenyl propyl amine derivatives of the formula

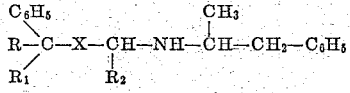

wherein R represents a member selected from the group consisting of alkyl having at most 4 carbon atoms and phenyl, $R_1$ represents alkyl having at most 4 carbon atoms, $R_2$ is a member selected from the group consisting of hydrogen and methyl, and X is selected from the group consisting of

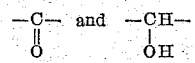

and (2) pharmaceutically acceptable acid addition salts thereof.

2. The compound of the formula

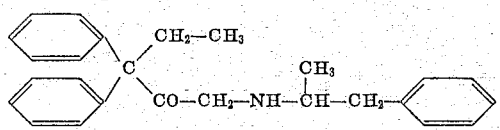

3. The compound of the formula

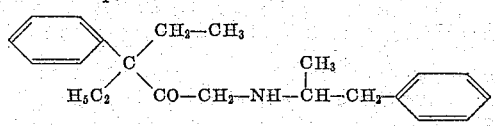

4. The compound of the formula

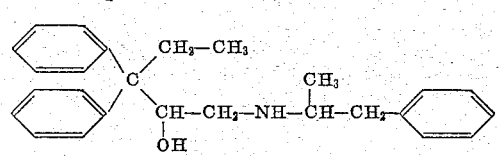

References Cited in the file of this patent

UNITED STATES PATENTS

| | | |
|---|---|---|
| 2,862,968 | Tiffany | Dec. 2, 1958 |
| 2,879,294 | Campbell | Mar. 24, 1959 |
| 2,997,422 | Tedeschi | Aug. 22, 1961 |
| 2,997,479 | Schlesinger et al. | Aug. 22, 1961 |
| 3,011,945 | Bolling et al. | Dec. 5, 1961 |